United States Patent Office 3,415,165
Patented Dec. 10, 1968

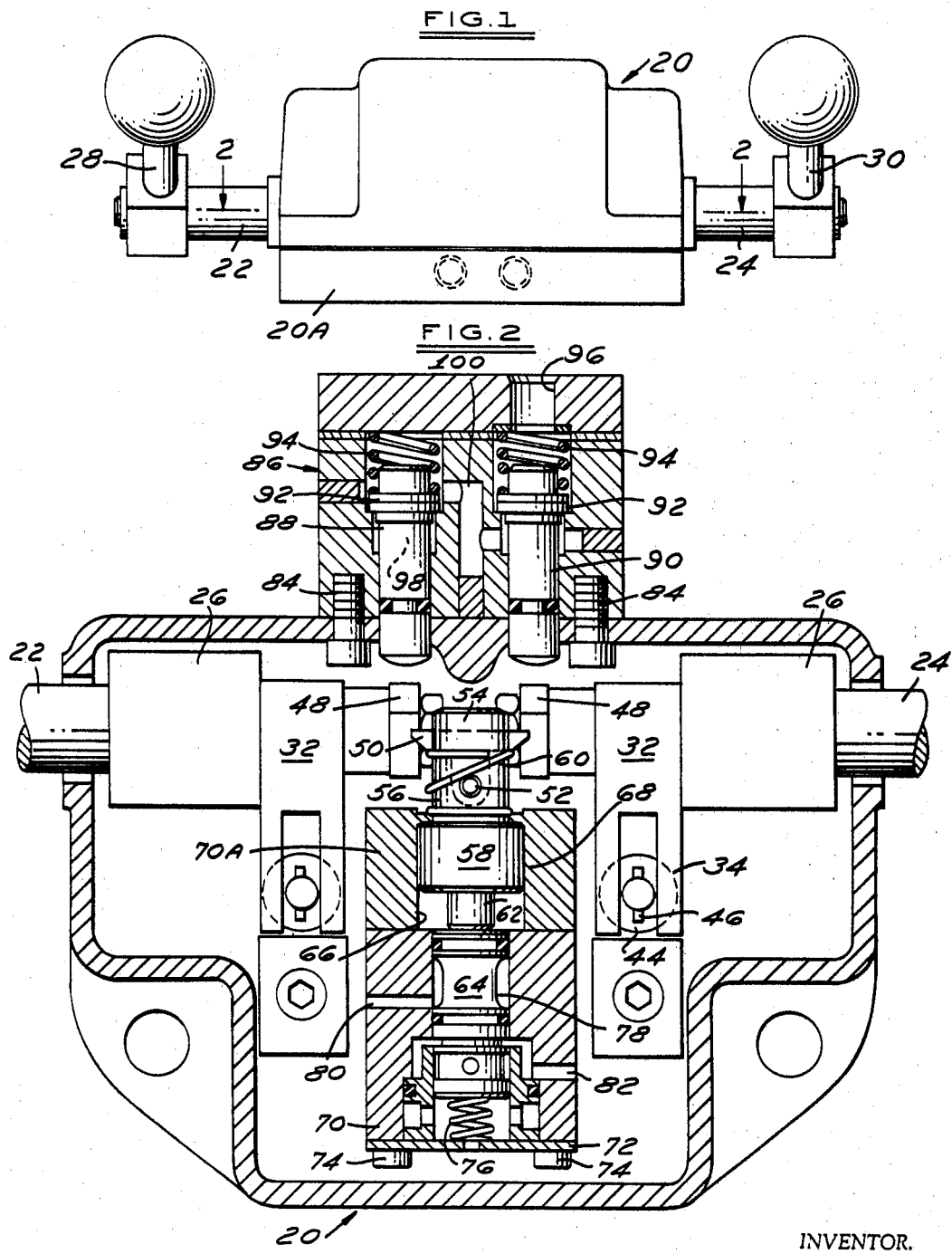

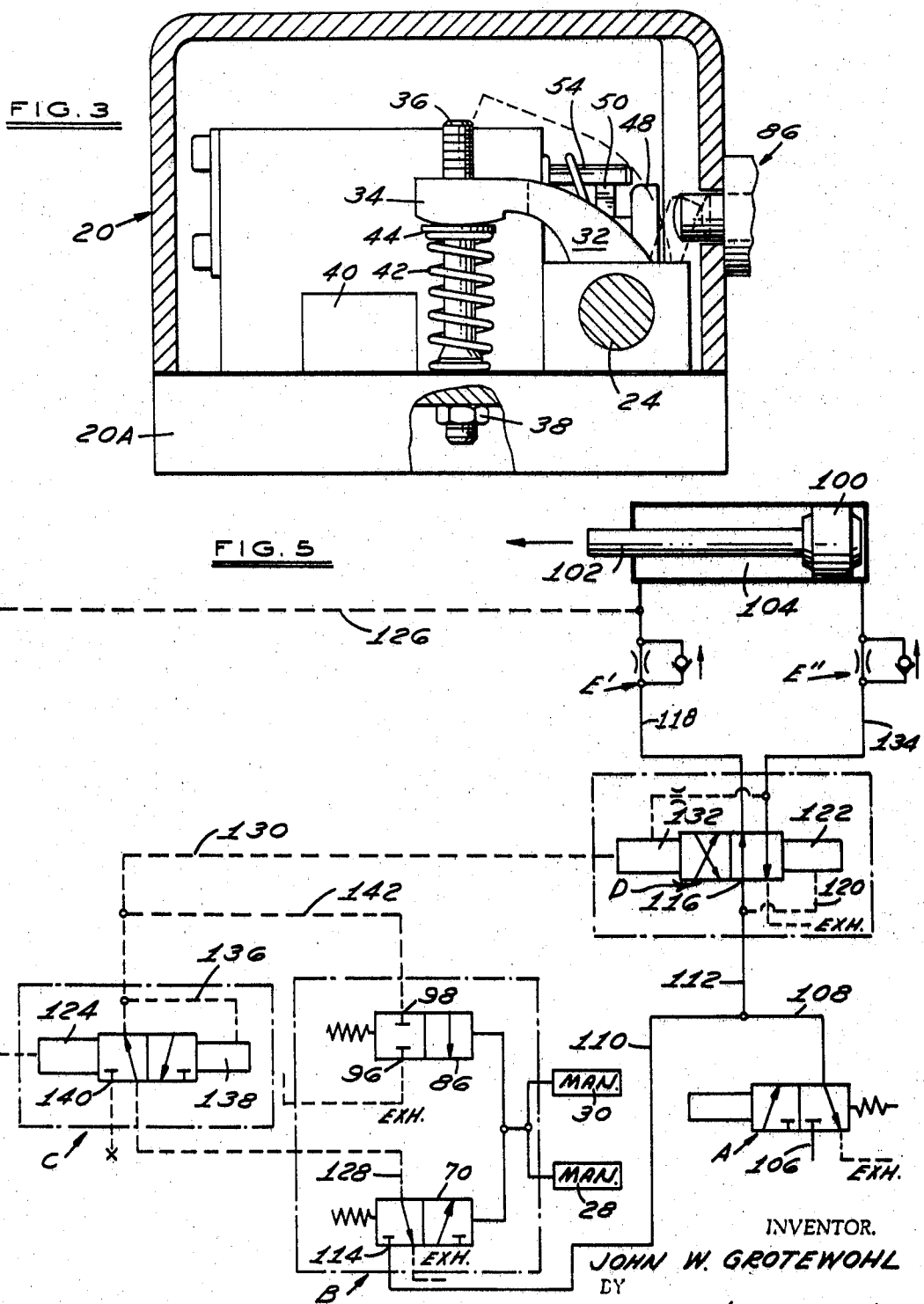

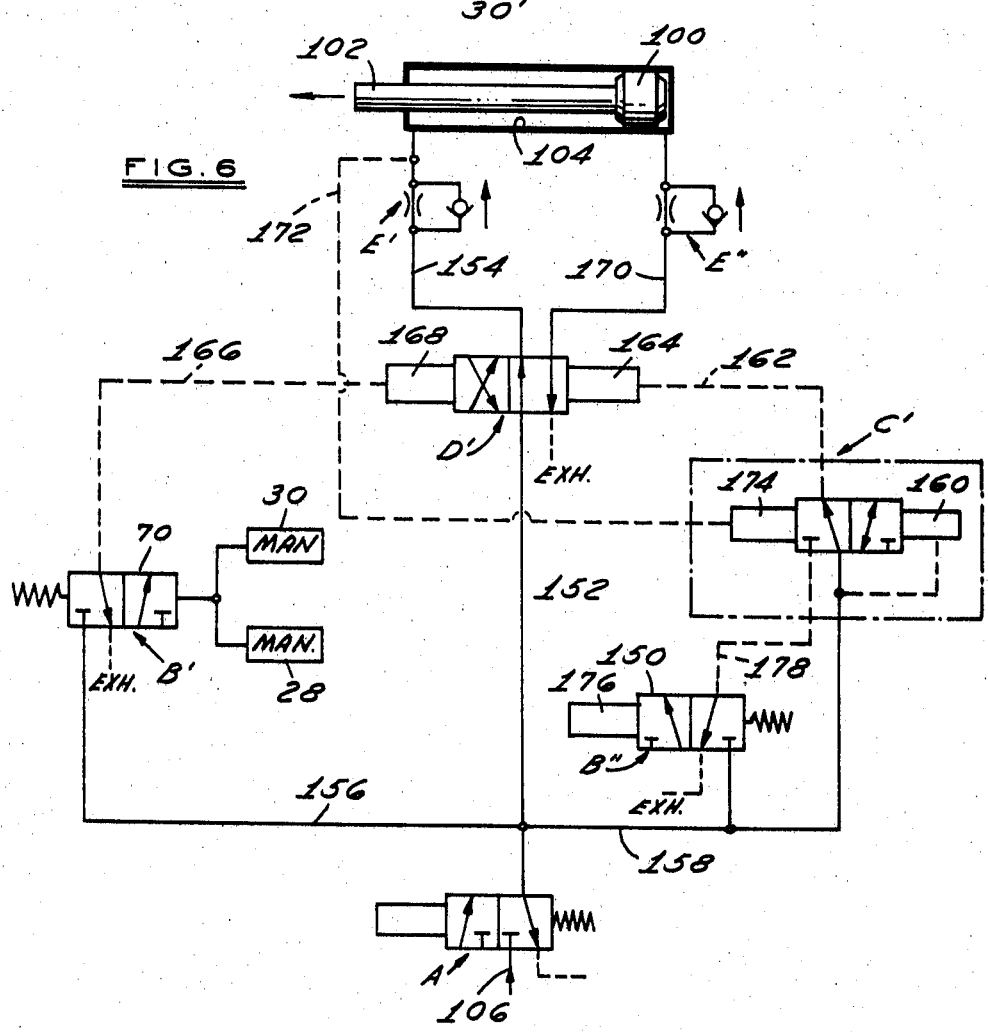

3,415,165
SAFETY DEVICE
John W. Grotewohl, Southfield, Mich., assignor, by mesne assignments, to Rex Chainbelt Inc., Milwaukee, Wis., a corporation of Wisconsin
Filed Mar. 29, 1967, Ser. No. 626,743
10 Claims. (Cl. 91—425)

ABSTRACT OF THE DISCLOSURE

The invention disclosed herein relates in general to a safety device including control mechanism for use in controlling the operation of power driven machinery. The device comprises two spaced-apart actuating members so arranged as to require the constant simultaneously operative presence of two hands of the machine operator on two handles of the actuating mechanism, which must be manually simultaneously actuated in one direction of movement to initiate and maintain power movement of the machine, which handles may be movable in a second direction to de-actuate the power machine. Control circuitry is provided which positively insures that the system, once actuated, remains "locked in" until a second operation is performed to "unload" or return the system to its inoperative position. The device has been designed to provide a means of loading and unloading certain types of equipment through manual operation, and demands two-handed operation for each operating function to achieve ultimate operator safety.

The mechanism disclosed herein is an improvement upon and refinement of the structure disclosed in U.S. Patent No. 3,246,728 of Frederick W. Hicks, Jr., and myself, and together with the novel control circuitry disclosed herein, provides a more versatile and widely usable safety device for controlling the operation of power driven machines.

An object of the invention is the provision of improved safety control mechanism for power driven machines requiring the sustained simultaneous pressure of both hands of the machine operator on two handles of the control mechanism to institute and maintain the power movement of the machine, and wherein removal of either hand before the power operation is complete automatically returns the machine to its normal inoperative position.

Another object of the invention is the provision of a safety device which, it is believed, cannot be circumvented or by-passed and wherein the actuating handles cannot be tied down, operated by one hand of the operator or tampered with after installation. The device is so designed as to require the simultaneous presence of both hands of the operator upon separated handle portions comprising the actuator, with pressure being continuously applied for a predetermined time period to initiate action of the mechanism.

A further object is the provision of a safety device of the character described wherein the manually shiftable handles of the actuating mechanism automatically return to a neutral or inoperative position upon release thereof by the operator, the simultaneous and continuous movement of the two handles in one direction being operable to institute and maintain the power movement of the machine being controlled, while simultaneous momentary movement of the handles in the opposite direction is operable to return the controlled machine to its original at-rest position. Such a device is particularly well-suited for use in controlling machinery wherein a workpiece is inserted into the machine and thereafter clamped in position, and once firmly clamped and held in position, further operations are performed on the workpiece, and the workpiece then unclamped and removed from the machine. However, it is to be understood that the invention is not restricted to the specific controlling function performed by the device, and that it may be advantageously used to control various other power-driven machine functions.

Another important object is the provision of a safety device including control circuitry operable to maintain the system in actuated condition once it has been fully actuated, and operable to return the system to its initial inoperative position after the desired operations have been performed.

Another object is the provision of sensing valves in a safety device of the character set forth wherein the sensing valves are operable to sense a decaying pressure and to perform a given function in response to the pressure decay. An advantageous feature of the disclosed sensing valve provided in the safety device is that they operate to perform a function similar to a pressure switch without the critical pressure spikes or surge effects which are common with the latter.

The mechanical actuating arrangement is similar to that disclosed in the above-identified patent in that it includes connecting linkage extending between two hand-engageable parts of two shiftable elements, and is provided with a tiltable plate forming a part of the linkage. the plate is so supported that it must be acted upon simultaneously by the shiftable elements which are moved by pressure applied from both handles of the mechanism. Other than simultaneous pressure application will displace the tiltable plate so as to render it ineffective to transmit movement to to actuating device controlling the functioning of the machine. When the plate is displaced or tilted so that it does not transmit the requisite movement, the hand-engageable parts of the two shiftable elements must be fully released and returned to original starting position, rendering it impossible to apply pressure initially to one handle and then later apply pressure to the other handle and thereby obtain operation of the machine.

Once the handles have been simultaneously shifted in one direction and held a sufficient time to complete movement for operation of the machine element being controlled, the handles may be released, at which time they will automatically return to their neutral position, while the machine element is retailed in operative position permitting the desired machine functions to be carried out without the necessity of the operator maintaining pressure upon the handle elements. Once the machine has performed the desired functions, the control is de-actuated to return the machine to its inoperative position. In one embodiment, the handle elements may be shifted simultaneously in the opposite direction to return the machine to its normal at-rest or inoperative position. The device is so designed that only momentary movement in such opposite direction is required, and the handle elements when released automatically return to their neutral position.

While the description which follows and the appended drawings show the safety device operable to control a single machine element, it will become apparent to those skilled in the art upon a perusal of the disclosure that the device may be used in parallel or series circuits for multiple operating stations, and it is to be understood that the invention is not restricted to a single control for controlling the operation of a single machine element.

Other objects, advantages and meritorious features will more fully appear from the following detailed description, claims and accompanying drawings wherein:

FIG. 1 is a front elevation of the safety control mechanism of this invention;

FIG. 2 is a horizontal section, on an enlarged scale, taken substantially along line 2—2 of FIG. 1;

FIG. 3 is a vertical section taken along line 3—3 of FIG. 2;

FIG. 4 is an end elevation showing the handle of the operating element;

FIG. 5 is a schematic control diagram showing the pneumatic circuitry associated with the operating device to control the machine element; and FIG. 6 is a schematic diagram similar to FIG. 5 showing a slightly modified control circuitry.

The control linkage illustrated in the drawings is enclosed within a housing 20 or the like, from opposite ends of which project rotatably supported shafts 22 and 24, each of which are journaled in a large bearing 26 within the housing. The housing is so designed that the two manually actuatable handles cannot be operated by one hand of an operator or conveniently bridged for operation by a single hand. Rigidly mounted on the extremities of the shafts 22 and 24 are the manually shiftable handle elements 28 and 30 each actuatable to rotate its respective shaft. The handlers have been shown herein with ball-type hand-engaging portions, but other designs, such as paddles or the like, may be provided if desired.

Secured to each of the shafts 22 and 24 adjacent the inner end thereof is an arcuate lever 32, the free end of the lever being slotted to form a clevis-like end portion engageable over a fixed upstanding stud 36 secured to the housing as by a nut 38. Encircling the lower portion of the stud 36 is a coil spring 42 shown in FIG. 3 in its relaxed position, the spring being surmounted by a washer 44 and a stop pin 46 extending through the stud 36 and bearing against the washer to limit upward movement of the spring. FIG. 4 shows one of the handle members 30 in its normal at-rest position, and in this position of the handle, the arcuate lever 32 is in the position shown in solid outline in FIG. 3. Thus the lever 32 is maintained in such position resting upon the top of washer 34 by force of gravity. Considering the parts of the mechanism shown in FIGS. 3 and 4, the shaft 24 is rotated to move the member 32 against the tension of spring 42 by manual downward pressure upon the handle 30. A stop block 40 upstanding from the lower wall of housing 10 serves as a stop to limit the downward movement of the lever 32 upon depression of handle 30 the handle being shown in its fully depressed position in dotted outline at 30' in FIG. 4.

Referring to FIGS. 2 and 3, mounted upon the inner extremity of each shaft 22 and 24 is an upstanding lever or finger 48 positioned so as to engage opposite ends of a tiltable plate 50. The plate 50 is tiltably or pivotally supported upon a vertical pivot pin 52 carried by the slotted end portion 54 of a plunger 56 having an enlarged diameter portion 58. The tilt plate 50 is maintained in its position extending with its head transverse to the plunger 56 by a light spring 60 interposed between the plate 50 and the top of the body member 70a. The plunger is also provided with a reduced diameter rear end portion 62 which bears against one end of a fluid pressure valve piston 64 which will be described in detail hereinafter. The plunger 56 is supported for reciprocation in a cylindrical bore 66 formed in the member 70a, and a small pin or key 68 received within a keyway or slot in the plunger portion 58 prevents undesirable rotation of the plunger during its shiftable movement.

The valve spool 64 is slidably mounted within a valve body 70, closed at one end by a back plate 72 secured to the body as by cap screws 74. A spool spring 76 interposed between the spool and the back plate urges the spool forwardly in the valve body. The spool 64 exhibits an intermediate portion of reduced diameter 78 to provide a passageway for fluid around the spool. The valve body 70 is provided with a fluid inlet passage 80 and a fluid outlet passage 82 which are coupled to fluid pressure conduits leading out of the base housing 20a. An O-ring seal is provided at the top of the spool 64, and two lip seals are used at the opposite end of the reduced diameter portion 78 to prevent pressure fluid by-passing the valve.

Mounted upon the rear wall of the housing 20 and secured thereto by a pair of cap screws 84 or the like is a valve body 86 having a pair of valve stem assemblies 88 and 90 positioned for shiftable movement therein, each valve stem having an inner end portion projecting through the housing wall for engagement by a respective finger member 48 as shown in FIG. 2. Each valve stem is provided with a sealing member 92 engageable with a seat in the valve body, and the valve stems are held in sealing engagement with the seat by a coil spring 94. A fluid pressure inlet 96 communicates with the chamber surrounding valve stem 88, while a fluid pressure exhaust 98 communicates with the chamber of valve stem 90. Fluid conducting passageway means 100 within the valve block 86 establish communication between the two valve chambers, so that upon shifting of the valve stems 88 and 90 simultaneously upwardly as shown in FIG. 2, fluid communication is established between inlet port 96 and exhaust port 98 for the purpose hereinafter described.

As shown in FIG. 1, the rotatable shafts 22 and 24 are each provided at their outer ends with a handle member 28 and 30, one of which is shown in its normal at-rest position at 30 in FIG. 4. The simultaneous depression of the handle members 28 and 30 imparts rotation to the shafts 22 and 24, shifting the two finger elements 48 into simultaneous engagement with the tilt table 50. Assuming that the fingers 48 contact opposite ends of the tilt table 50 simultaneously, plunger 56 will be shifted by the depression of the handles, in turn shifting valve spool 64 and establishing communication between fluid inlet passage 80 and fluid outlet passage 82 around reduced diameter portion 78 of the valve spool 64. Fluid under pressure will thus be delivered to the control valves hereinafter described to operate the machine element being controlled. In the event that only one of the handles are actuated to impart rotation to one shaft, say for example shaft 22, only one finger 48 will be moved into contact with tilt table 50, which will then rotate on its pin 52, moving the opposite end of the tilt table out of the path of movement of the remaining finger 48. Shiftable movement of the remaining finger 48 by depression of the other handle to rotate the shaft 24 will be ineffectual to shift plunger 56 and valve spool 64.

Therefore if one shaft is rotated independently of the other, its associated finger 48 would tilt the plate 50, imparting no movement to the plunger 56, and moving the table 50 out of the path of the remaining finger 48 so as to render the mechanism inoperable to actuate the valve spool 64. As shown in FIG. 3, rotation of shaft 24 in a counterclockwise direction by depression of the handle 30 associated therewith shifts member 32 against the pressure of spring 42 downwardly against the stop block 40, movement of the member 32 being guided by the upstanding stud 36. Upon release of the handle, the member 32 is spring-returned to its position shown in FIG. 3, which in turn also returns the finger 48 to its upright inoperative position.

As will appear more fully hereinafter, both handle members 28 and 30 must be depressed simultaneously and held in depressed position for a predetermined time period to actuate the machine element being controlled. Release of one or both of the handles before the time period expires will interrupt communication between the inlet 80 and outlet 82, and the element will be returned to its original de-activated position. Referring to FIG. 2, release of only one handle will result in movement of its associated finger 48 to the position shown therein, which will cause table 50 to tilt, returning the plunger 56 and spool valve 64 to inoperative position in similar fashion to that above described when only one handle is depressed. Once the machine element to be controlled has been shifted to its operative position, the handles 28 and 30 may be released, and circuitry to be described thereafter retains the machine element in its operative position until a separate operation is performed to exhaust the circuitry and return the element to its original inoperative position. Exhaust or unloading of the system is accomplished through the actuation of valves 88 and 90 within the housing 86 through circuitry to be described. Actuation of these two valves is accomplished by raising both handles 28 and 30 to rotate the shafts 22 and 24 in a direction shifting the fingers 48 into contact with the valve stems 88 and 90 to lift the valves from their seats against the spring pressure 94, thereby establishing fluid communication between the inlet 96 and exhaust 98 in valve block 86 as shown in FIG. 2. As hereinafter described, supply of fluid under pressure through inlet 96 operates to return the controlled machine element to its original at-rest position.

Turning now to FIG. 5, there is shown therein the fluid pressure control circuitry associated with the mechanical linkage hereinabove described for controlling the operation of the power-driven machine. Shown schematically in FIG. 5 are the two manually actuatable handles 28 and 30 which are moved by the operator to accomplish actuation of the control circuit. The machine element to be controlled is also schematically shown in FIG. 5, and in the illustrative embodiment comprises a fluid pressure operated piston 100 having a piston rod 102 reciprocable in a cylinder 104. The piston 100 is shown in its neutral or at-rest position at the right-hand end of the cylinder 104 in FIG. 5.

To make the description more easily intelligible, each of the valves has been designated by a letter in FIG. 5, the valves being referred to by the function which they perform in the system. Briefly, valve A is a main supply valve for supplying pressure fluid, in this case air, to the system. Valve B comprises in effect two valves, the actuating valve enclosed within housing 70 in FIG. 2, and the exhaust valve means enclosed within the housing 86 of FIG. 2. The actuating valve per se has been designated 70 while the exhaust valve has been designated 86 in FIG. 5 to provide correspondence with reference numerals used in FIG. 2. Valve C shown in FIG. 5 is a sensing valve, while valve D is a power valve. There are in addition provided two speed control valves in the circuit, which have been designated E′ and E″.

The valves are shown in FIG. 5 in their normal at-rest condition, and their operation will be described using such condition as an initial starting base. In the following description, air will be used as the fluid pressure medium, although it will be apparent that other pressure fluids may be utilized in lieu thereof.

Main supply air is delivered to the supply valve A under pressure through line 106, and with the valve A in the position shown, none of the remaining valves in the circuit are supplied with air, the cylinder 104 is not pressurized, and the piston 100 may be at any position within the cylinder. Actuation of valve A is the first operation that must be performed by the operator, and such supplies air under pressure to line 108, and from thence through branch lines 110 and 112, pressurizing the inlet port 114 of the actuator valve 70, and also supplying pressure air to the inlet port 116 of power valve D. Line 118 will be pressurized by the power valve D and as can be seen, pressurization of line 118 will pressurize the left-hand end of cylinder 104, returning the piston 100 therein to its retracted position to the right of the cylinder as shown in FIG. 5. Internal porting shown at 120 will likewise pressurize pilot 122 of power valve D, to retain the power valve in its de-actuated position. Air supply through line 118 will also pressurize pilot 124 of sensing valve C through line 126, shifting valve C to its actuated position, or holding it in its actuated position depending upon its position at the initiation of the supply of air thereto. With actuating valve 70 of unit B pressurized at port 114 and with pressure air supplied to the left-hand of the cylinder through line 118 and to pilot 124 of sensing valve C through line 126, the circuit is ready for operation.

To actuate the system, the operator depresses both handles 28 and 30 simultaneously as described hereinabove to shift plunger 56 against valve spool 64 in valve body 70 (see FIG. 2) shifting the valve to supply pressure air through port 114 and line 128, and through sensing valve C, which has already been actuated by its pilot 124, and thence through line 130 to the pilot 132 of power valve D. Pressurization of pilot 132 shifts power valve D to its actuated position, pressurizing line 134 and supplying air pressure to the right-hand end of cylinder 104 to shift the piston 100 to the left as indicated by the arrow in FIG. 5. Each of the sensing valves E′ and E″ include a check valve permitting free flow of pressure air in the direction indicated by the arrows while preventing reverse flow through the check valve in parallel with a metering valve providing restricted flow in the opposite direction through the valves E′ and E″.

Shifting of the power valve D to its actuated position opens line 118 to exhaust, and as the piston 100 shifts in the direction indicated by the arrow, air from the left-hand end of the cylinder is held at a specific back pressure by the metering setting of speed control valve E′, which likewise retains line 126 pressurized to maintain pilot 124 of sensing valve C actuated during movement of the piston in the cylinder. When the piston 100 reaches its limit of travel, the pressure in line 118 decays to zero through metering needly of the speed control valve E′, and the pressure in pilot 124 of sensing valve C also decays to zero through line 126, valve E′ and line 118. Previously pressurized line 130 has a branch line 136 pressurizing pilot 138 of valve C, and therefore when the pressure in pilot 124 of the valve decays to zero, pressure in pilot 138 shifts the valve to its de-actuated position, diverting the pressure in line 130 to a blocked port 140 in valve C, thereby blocking the exhaust through the sensing valve, maintaining pressure in line 130, which through pilot 132 maintains power valve D in its actuated position, pressurizing the line 134 and holding the piston 100 in its operative position to the left-hand end of cylinder 104 in FIG. 5.

With the shifting of pilot 138 to block any depressurization of line 130 through sensing valve C, the circuit is sealed in, and the operator may then release handles 28 and 30, and the circuit will remain in actuated condition, i.e., with the piston 100 held by air under pressure at the left-hand end of cylinder 104. However, if the operator releases pressure on the handles 28 and 30, or either of them, before pilot 138 shifts the sensing valve C to its "locked in" condition, valve 70 will immediately be shifted to its exhaust condition, exhausting line 130 and de-actuating power valve D, which will automatically pressurize line 118 and depressurize line 134 to return the piston to its initial position to the right-hand end of cylinder 104. With the machine element in its actuated position, shown for simplicity as piston rod 102 in FIG. 5, and with the circuit "locked in" to maintain the element 102 in such actuated position, various machine functions may be performed by the operator without any further manipulation of the safety device. Of course, the machine may be programmed to perform certain operations on a workpiece or the like automatically upon the conclusion of the control circuit functions above described. As an example, the above may be utilized to perform a clamping function on a workpiece in a machining fixture or the like, and once clamped, the workpiece will remain clamped in the machine until the desired operations are performed thereon, at which point the operator may release the clamping device by the sequence described hereinbelow.

To accomplish "unloading" of the circuits shown in FIG. 5, the operator raises handles 28 and 30 to shift the fingers 48 (see FIG. 2) against their associated valve stems 88 and 90, opening line 142 to exhaust through ports 98 and 96 and the internal passages of the exhaust valve 86. Line 130 and pilot 132 of power valve D are thus exhausted through valve 86, returning power valve D to its de-actuating position, returning line 134 to exhaust and pressurizing line 118 to supply pressure air to the left-hand end of cylinder 104. The piston 100 retracts or moves to the right at a rate determined by the setting of the speed control needle in the valve E″, and as the pilot 122 is now pressurized through line 112, the operator may release the handles after momentary actuation, because the power valve D will be de-actuated immediately upon the depressurization of lines 130 and 142 by opening the two valve elements comprising the exhaust valve 86.

From the above description of the control circuit of FIG. 5, it will be observed that the return of the machine element, in this case piston rod 102, is accomplished by exhaust of the circuit, that is, pilot 132 of power valve D is exhausted through lines 130 and 142 upon the actuation of valve 86 to shift the power valve to its de-actuated position, pressurizing line 118 and exhausting line 134 to return the piston 100 to its retracted position to the right of the cylinder 104. In FIG. 6 there is shown a slightly modified circuit wherein a portion of the circuit is pressurized rather than exhausted to accomplish the return of the machine element to its normal position. The circuit of FIG. 5 therefore might be characterized as an exhaust-to-reset circuit, while the circuit of FIG. 6 may be characterized as a pressure-to-reset circuit.

In the following description of the circuit of FIG. 6, the same reference numerals have been used to designate those parts of the circuit which are identical to the ones previously described with reference to FIG. 5. Thus the main supply valve A, the speed control valves E′ and E″, and the piston cylinder assembly 100, 102 and 104 have been given the same reference numerals. The actuating valve 70 is physically the same as hereinbefore described with reference to FIGS. 2 and 5, but the exhaust valve 86 has been replaced by a different type of valve to be described hereinafter. These two valves are arranged in a slightly different manner within the circuit for purposes which will become apparent. The valve 70 of the safety control has been designated B′, while the pressure reset valve 150 has been generally designated B″ in FIG. 6. The pressure reset valve 150 may be positioned in a location remote the housing 20, rather than being mounted on the housing, as was the exhaust reset valve 86 shown in FIG. 2. The valve 150 thus may be independently manually actuated, and the linkage mechanism within housing 20 and the handles 28 and 30 operated only to actuate the machine element. The circuit of FIG. 6 also includes a power valve D′ and a sensing valve C′ which operate in a similar manner to their counterparts D and C in FIG. 5.

As can be seen from an examination of FIG. 6, actuation of the main supply valve A establishes communication from the inlet conduit 106 through line 152 and the power valve D′ and thence through the line 154 and speed control E′ to urge the piston 100 to the right-hand end of cylinder as shown in FIG. 6, or to retain the piston in such position if already there when the main valve A is actuated. Pressure air is likewise supplied through line 156 to the inlet port of valve B′ and through line 158 to the sensing valve C′, where pilot 160 is pressurized through internal porting. The pilot 160 is always pressurized when the main valve A is actuated, and acts as a constant spring operable to return the sensing valve C to the de-actuated position. Pressure air is also supplied through line 162 to the pilot 164 of the power valve D′, retaining the latter in its de-actuated condition as shown in FIG. 6. Under these conditions, supply air is blocked at the inlet ports of valves B′ and B″ until such valves are actuated as described hereinbelow.

When the operator desires to actuate the system, simultaneous pressure on handles 28 and 30 actuates the linkage shown in FIG. 2 in the same manner as hereinabove described to shift valve 70, pressurizing line 166 and pilot 168 of the power valve D′, shifting the power valve to its actuated position and supplying pressure fluid through lines 152 and 170 to shift the machine element to its actuated position, that is, to the left in FIG. 6. Shifting of valve D′ opens line 154 to exhaust, and as the machine element shifts to the left, speed control E′ meters the exhaust air, and the pressure in line 172 is held pressurized until the element reaches its limit of travel, and then the pressure in line 172 decays to zero through the speed control E′. The pressure in pilot 174 of valve C′ likewise decays to zero, and the valve shifts to de-actuated position, opening line 162 and pilot 164 to exhaust through valves C′ and B″. The circuit is now sealed in and the operator may remove his hands from the handles 28 and 30, thus shifting the control valve B′ to its de-actuated position. As pilot 164 of power valve D′ is open to exhaust, such valve will remain in its actuated position.

When the desired functions have been performed by the controlled machine, the operator manually actuates the cylinder retract valve 150 by manipulation of its manual actuator 176, shifting the valve to pressurize line 178 and line 162 through sensing valve C′. This pressurizes the pilot 164 of power valve D′, shifting the power valve to its de-actuated position, and thereby pressurizing line 154 to retract the piston 100, and also pressurizes line 172 to shift pilot 174 and move sensing valve C′ back to its actuated position.

There is thus shown a foolproof safety mechanism for controlling a movable machine element, which element is shiftable to an operative position and retained therein while other operations are performed on a workpiece or the like, the machine element being thereafter returned to an inoperative position, ready to be again actuated through another cycle of operation.

What is claimed is:

1. Safety control mechanism for a machine having an element shiftable between operative and inoperative positions, comprising, in combination: a housing; two shaft sections rotatably supported in the housing with their inner ends lying in spaced apart relation and their outer ends projecting beyond opposite housing ends and each provided with a manually operable handle portion to rotate its respective shaft section; a laterally projecting finger fixed to the inner end of each shaft section; a plunger mounted for reciprocal movement in the housing having a part engageable by said fingers to shift the plunger, said part operable only upon simultaneous rotation of said shaft sections; fluid pressure valve means coupled to said movable machine element and operable in response to plunger movement to supply pressure fluid to the element for shifting it to its operative position; and fluid pressure sensing means responsive to the arrival of the element at its fully operative position to maintain fluid pressure against said machine element to retain it in said position.

2. The invention as defined in claim 1 characterized in that said fluid pressure valve means includes an actuating valve operable in response to movement of said plunger and a power valve coupled to opposite ends of said machine element to shift the element between operative and inoperative positions; and said sensing means is coupled to said power valve for maintaining the latter pressurizing the machine element toward its operative position upon de-actuation of said control valve.

3. The invention as defined in claim 2 characterized in that additional valve means is provided coupled to said power valve operable independently of said actuating valve to shift the power valve, pressurizing the machine element to shift it to its inoperative position.

4. The invention as defined in claim 3 characterized in that speed control valve means is interposed between each end of said machine element and a respective end of said power valve, each speed control including a check valve portion permitting free fluid flow from the power valve to the element while blocking reverse flow and a metering valve portion restricting exhaust fluid flow from the element.

5. The invention as defined in claim 4 characterized in that said sensing means is coupled to that one of said speed control valves which meters exhaust during movement of said machine element to its operative position, said sensing valve actuated in response to decaying pressure when the element reaches such operative position, thereby retaining the power valve in its position pressurizing the machine element toward said operative position.

6. Safety control mechanism for a machine having an element shiftable between operative and inoperative positions, comprising, in combination: two manually operable mechanical elements each provided with a hand engageable part, each mechanical element biased to a normal neutral position and supported for manually shiftable movement in opposite directions from said neutral position, and each element provided with an actuating part mounted for shiftable movement therewith; and control means coupled to said machine element operable to shift the element between its operative and inoperative positions, said control means including a first part positioned for actuation by said actuating parts of the mechanical elements when shifted in one direction and a second part positioned for actuation by said actuating parts of the mechanical elements when shifted in the opposite direction, actuation of said first part operable to shift the machine element to its operative position and actuation of said second part operable to return said machine element to its inoperative position.

7. The invention as defined in claim 6 characterized in that said control means comprises a fluid pressure operated power valve coupled to said machine element and operable to supply pressure fluid selectively to the element to shift the same, and said first and second parts include fluid pressure valves coupled to said power valve to actuate the power valve.

8. The invention as defined in claim 6 characterized in that said first part of the control means includes a shiftable plunger positioned for engagement by said shiftable actuating parts of said mechanical elements, said plunger being mechanically shiftable to operate the control means when said actuating parts are engaged therewith substantially simultaneously by simultaneous movement of said mechanical elements, and said plunger being ineffective to operate the control means when the actuating parts are engaged therewith other than simultaneously.

9. The invention as defined in claim 6 characterized in that said second part of the control means includes a pair of independently movable members in series with each other, each member engageable with a respective actuating part of said mechanical elements whereby movement of both members is required to actuate the control means, movement of only one of the members being ineffective to accomplish such actuation.

10. The invention as defined in claim 7 characterized in that said control means includes fluid pressure sensing means coupled to said power valve operable to lock said power valve in actuated position, said sensing means operable in response to the movement of the machine element to its operative position.

References Cited

UNITED STATES PATENTS

| 2,314,398 | 3/1943 | Hoch | 91—425 |
| 2,341,696 | 2/1944 | Davis | 91—425 |
| 2,381,918 | 8/1945 | Lornitzo | 91—424 |

FOREIGN PATENTS 403,1154  6/1933  Great Britain.

PAUL E. MASLOUSKY, *Primary Examiner.*

U.S. Cl. X.R.

91—447, 461, 443